(12) United States Patent
Goodman

(10) Patent No.: US 7,976,610 B2
(45) Date of Patent: Jul. 12, 2011

(54) PRESSURE CONTROL IN DIRECT SMELTING PROCESS

(75) Inventor: John Neil Goodman, Mt. Pleasant (AU)

(73) Assignee: Technological Resources Pty. Limited, Melbourne (AU)

( * ) Notice: Subject to any disclaimer, the term of this patent is extended or adjusted under 35 U.S.C. 154(b) by 51 days.

(21) Appl. No.: 12/298,478

(22) PCT Filed: Apr. 24, 2007

(86) PCT No.: PCT/AU2007/000534
§ 371 (c)(1),
(2), (4) Date: May 4, 2009

(87) PCT Pub. No.: WO2007/121531
PCT Pub. Date: Nov. 1, 2007

(65) Prior Publication Data
US 2009/0320647 A1 Dec. 31, 2009

(30) Foreign Application Priority Data
Apr. 24, 2006 (AU) .............................. 2006902131

(51) Int. Cl.
*C21B 11/08* (2006.01)
*C21C 7/072* (2006.01)
(52) U.S. Cl. .................. 75/378; 75/444; 75/532; 75/548
(58) Field of Classification Search .................. 266/155, 266/156, 145, 89; 75/532, 548, 378, 444
See application file for complete search history.

(56) References Cited

U.S. PATENT DOCUMENTS

| | | | |
|---|---|---|---|
| 4,861,369 A * | 8/1989 | von Bogdandy et al. | 75/492 |
| 6,379,422 B1 * | 4/2002 | Dry | 75/446 |
| 6,402,808 B1 | 6/2002 | Dry | |
| 6,519,942 B2 | 2/2003 | Wintrell | |
| 6,585,929 B1 | 7/2003 | Bates et al. | |
| 7,364,691 B2 * | 4/2008 | Barker et al. | 266/275 |

FOREIGN PATENT DOCUMENTS

EP 431556 A1 * 6/1991

(Continued)

OTHER PUBLICATIONS

Sumitomo Metal Mining Co; "Control Method of Internal Pressure of Self-Fluxing Furnace", Derwent Abstract Accession No. 95-119325/16, JP 07043081A, 1 sheet, (1995). Sam Soc Acier Monte; "Process for Preheating Scrap—Using Furnace Exhaust Gases Allowing Optimisation of Furnace Operating Conditions by Control of Furnace Pressure", Derwent Abstract Accession No. 86-240393/37, FR 2576607A, 1 sheet, (1986).

(Continued)

*Primary Examiner* — George Wyszomierski
*Assistant Examiner* — Tima M McGuthry-Banks
(74) *Attorney, Agent, or Firm* — Finnegan, Henderson, Farabow, Garrett and Dunner, L.L.P.

(57) ABSTRACT

A direct smelting process for producing molten metal from a metalliferous feed material in a direct smelting vessel is disclosed. The process includes using a stream of off-gas from the vessel as a fuel gas in (i) stoves for generating a hot blast of air or oxygen-enriched air for the process and (ii) a waste heat recovery apparatus for generating steam for the process. The process also includes controlling pressure in the vessel by controlling pressure in the off-gas stream while the process is producing molten metal.

32 Claims, 2 Drawing Sheets

FOREIGN PATENT DOCUMENTS

Figure 1:
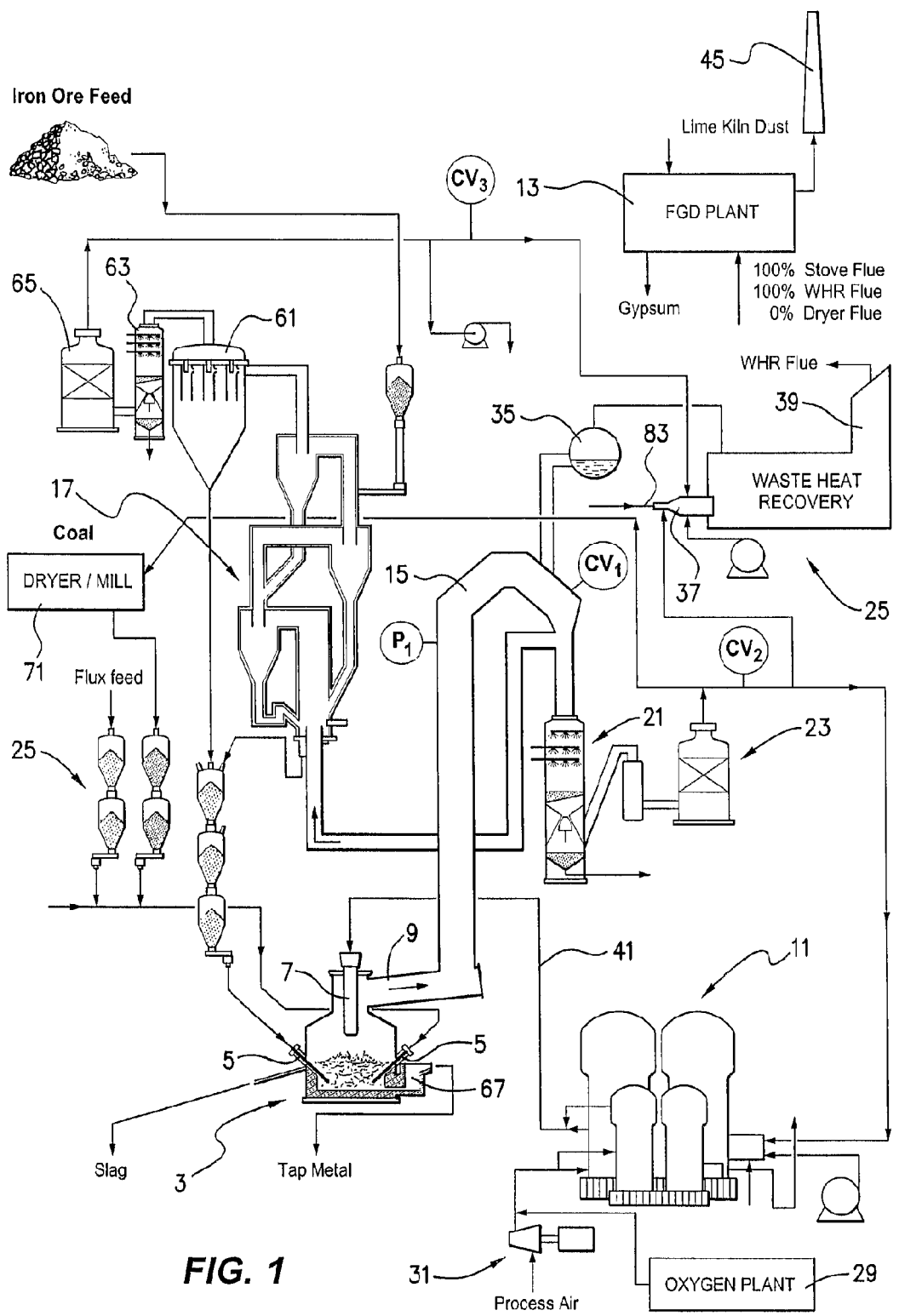

| | | |
|---|---|---|
| EP | 0 541 269 A1 | 5/1993 |
| JP | 59177329 A * | 10/1984 |
| WO | WO 96/31627 A1 | 10/1996 |
| WO | WO 01/11091 A1 | 2/2001 |
| WO | WO 2004/090173 A1 | 10/2004 |
| WO | WO 2004/090174 A1 | 10/2004 |
| WO | WO 2005/083130 A1 | 9/2005 |

OTHER PUBLICATIONS

UKR Metal WKS DES; "Method for Making Steel in Oxygen Converter", Derwent Abstract Accession No. 84-054668/09, SU 1013490A, 1 sheet, (1983).

* cited by examiner

PRESSURE CONTROL IN DIRECT SMELTING PROCESS

CROSS REFERENCE TO RELATED APPLICATIONS

This application is a national phase application based on international application number PCT/AU2007/000534, filed Apr. 24, 2007, and claims priority of Australian Patent Application No. 2006902131, filed Apr. 24, 2006, the content of both of which is incorporated herein by reference.

The present invention relates to a molten bath-based direct smelting process and plant for producing molten metal in a direct smelting vessel.

In particular, the present invention relates to controlling pressure in a direct smelting vessel.

The present invention relates particularly, although by no means exclusively, to molten bath-based direct smelting processes for producing molten iron from iron-containing metalliferous feed material, such as iron ores, partly reduced iron ores and iron-containing waste streams (for example, from steelmaking plants).

A known molten bath-based direct smelting process is generally referred to as the HIsmelt process. In the context of producing molten iron, the HIsmelt process includes the steps of:

(a) forming a bath of molten iron and slag in a direct smelting vessel;

(b) injecting into the bath: (i) a metalliferous feed material, typically iron ore in the form of fines; and (ii) a solid carbonaceous material, typically coal, which acts as a reductant of the metalliferous feed material and a source of energy; and (c) smelting metalliferous feed material to iron in the bath.

The term "smelting" is herein understood to mean thermal processing wherein chemical reactions that reduce metal oxides take place to produce molten metal.

In the HIsmelt process metalliferous feed material and solid carbonaceous material are injected into the molten bath through a number of lances/tuyeres which are inclined to the vertical so as to extend downwardly and inwardly through the side wall of the direct smelting vessel and into a lower region of the vessel so as to deliver at least part of the solids material into the metal layer in the bottom of the vessel. A blast of hot oxygen-containing gas, typically air or oxygen-enriched air, is injected into an upper region of the vessel through a downwardly extending lance to cause post-combustion of reaction gases released from the molten bath in the upper region of the vessel. Typically, in the case of producing molten iron, the hot air or oxygen-enriched air is at a temperature of the order of 1200° C. and is generated in hot blast stoves. Off-gases resulting from the post-combustion of reaction gases in the vessel are taken away from the upper region of the vessel through an off-gas duct. The vessel includes refractory-lined water cooled panels in the side wall and the roof of the vessel, and water is circulated continuously through the panels in a continuous circuit.

The HIsmelt process enables large quantities of molten iron, typically at least 0.5 Mt/a, to be produced by direct smelting in a single compact vessel.

However, in order to achieve high molten iron production rates in the HIsmelt process it is necessary to (a) generate and transport large quantities of hot air or oxygen-enriched air and carrier gas (for solids injection) to the direct smelting vessel, (b) transport large quantities of the metalliferous feed material, such as iron-containing feed materials, to the vessel, including generating and transporting large quantities of carrier gas to the vessel (c) transport large quantities of hot off-gas from the vessel, (d) transport large quantities of molten iron and slag produced in the process away from the vessel, and (e) circulate large quantities of water through the water cooled panels—all within a relatively confined area.

In view of the above, high molten iron production rates require a HIsmelt plant that includes (a) a pressurised direct smelting vessel and ancillary equipment such as lock hoppers for supplying solid feed materials to the vessel and pressure control equipment on the off-gas duct of the vessel, (b) stoves that produce the high flow rate of hot air or oxygen-enriched air for the vessel, and (c) off-gas treatment equipment that is capable of processing large quantities of off-gas discharged from the vessel.

Pressure control in the direct smelting vessel during molten metal production is an important issue for the above-described HIsmelt process.

In broad terms the present invention provides a direct smelting process for producing molten metal from a metalliferous feed material in a direct smelting vessel that includes using a stream of off-gas from the vessel as a fuel gas in at least one of (i) stoves for generating a hot blast of air or oxygen-enriched air for the process and (ii) a waste heat recovery apparatus for generating steam for the process and also includes controlling pressure in the vessel by controlling pressure in the off-gas stream while the process is producing molten metal.

More particularly, the present invention provides a direct smelting process for producing molten metal from a metalliferous feed material in a direct smelting vessel that includes:

(a) direct smelting metalliferous feed material above atmospheric pressure in a direct smelting vessel containing a molten bath of metal and slag and producing process outputs of molten metal, molten slag, and an off-gas, the process including supplying (i) pretreated solid metalliferous feed material, (ii) solid carbonaceous feed material, and (iii) air or oxygen-enriched air to the vessel;

(b) splitting the off-gas released from the direct smelting vessel into at least two off-gas streams, using a first off-gas stream in a pretreatment apparatus for pretreating metalliferous feed material that is subsequently supplied to the direct smelting vessel, and using a second off-gas stream as a fuel gas in at least one of (i) stoves for generating a hot blast of air or oxygen-enriched air and (ii) a waste heat recovery apparatus for generating steam; and (c) controlling pressure in the direct smelting vessel by controlling off-gas pressure in the second off-gas stream while the process is operating in accordance with step (a) and producing molten metal.

The present invention is based on the realisation that selection of pressure control via the second off-gas stream is a far more effective option compared to options such as pressure control via the first off-gas stream and pressure control via both the first and second off-gas streams simultaneously.

Preferably step (c) includes controlling the pressure in the direct smelting vessel to be substantially constant pressure while the process is operating in accordance with step (a) and producing molten metal.

Preferably step (c) includes controlling the pressure in the direct smelting vessel to be at least 0.6 bar gauge while the process is operating in accordance with step (a) and producing molten metal.

Preferably step (c) includes controlling the pressure in the direct smelting vessel to be within the range of 0.6 to 1.0 bar gauge while the process is operating in accordance with step (a) and producing molten metal.

More preferably step (c) includes controlling the pressure in the direct smelting vessel to be within the range of 0.7 to 0.9 bar gauge while the process is operating in accordance with step (a) and producing molten metal.

Typically, step (c) includes controlling the pressure in the direct smelting vessel to be 0.8 bar gauge while the process is operating in accordance with step (a) and producing molten metal.

Whilst preferred, the present invention is not confined to constant pressure operation in the direct smelting vessel and extends to operating under variable pressure in the direct smelting vessel while the process is operating in accordance with step (a) and producing molten metal.

Preferably the process includes cooling and removing particulate material and soluble gaseous species and metal vapours from the second off-gas stream in a water scrubber upstream of the at least one of stoves and waste heat recovery apparatus.

Preferably step (c) includes controlling the pressure in the direct smelting vessel by controlling the flow of off-gas flowing through an off-gas flow control valve ("primary flow control valve").

Preferably step (c) includes controlling the pressure in the direct smelting vessel by controlling the flow of off-gas flowing through the scrubber, hereinafter referred to as "the pressure control scrubber", by opening or closing an off-gas flow control valve in the scrubber.

Preferably the pre-treatment apparatus is a fluid bed based pre-treatment apparatus and more preferably a circulating fluid bed pretreatment apparatus.

Preferably the pretreatment apparatus includes a an off-gas flow control valve ("pretreatment flow control valve") for regulating flow rate of the first stream of off-gas through said pretreatment apparatus.

Preferably the process includes cooling and removing particulate material and soluble gaseous species and metal vapours from the first off-gas stream in a water scrubber downstream of the pretreatment apparatus.

In order to control off-gas pressure in the second off-gas stream while the process is operating in accordance with step (a) and producing molten metal, preferably a time constant of a control circuit for the primary flow control valve is selected to be significantly faster than a time constant of a control circuit for the pretreatment flow control valve.

Preferably the time constant of the primary flow control valve is twice as fast as the time constant of the pre-treatment flow control valve.

Preferably the time constant of the primary flow control valve is an order of magnitude faster than the time constant of the pre-treatment flow control valve.

Preferably the time constant of the primary flow control valve is in the order of ten times faster than the pre-treatment flow control valve.

Preferably the process includes controlling the off-gas flow in the first off-gas stream to be above a minimum volumetric flow rate for maintaining fluidising conditions in the pretreatment apparatus while the process is operating in accordance with step (a) and producing molten metal.

Preferably, the process includes controlling the off-gas flow in the first off-gas stream to be above a minimum volumetric flow rate to preheat metalliferous feed material to a predetermined temperature in the pretreatment apparatus while the process is operating in accordance with step (a) and producing molten metal.

The above steps of maintaining fluidising conditions and/or the pretreatment temperature of metalliferous feed material in the pretreatment apparatus are important in terms of ensuring optimum operation of a two stage direct smelting process involving pretreatment of metalliferous feed material in the pretreatment apparatus and thereafter smelting the pretreated material in the direct smelting vessel and producing molten metal.

Preferably the predetermined temperature for the pre-treated metalliferous feed material in the pretreatement apparatus is in the range of 600-700° C. when the metalliferous feed material is an iron-containing material.

Preferably the process includes supplying the first off-gas stream after it has been discharged from the pretreatment apparatus to waste heat recovery apparatus for generating steam for the process.

Preferably the process includes forming a combined off-gas stream upstream of the waste heat recovery apparatus from (i) the first off-gas stream discharged from the pretreatment apparatus and (ii) off-gas in the second off-gas stream and supplying at least a portion of the combined stream to the waste heat recovery unit for generating steam for the process.

Preferably the process includes supplying a portion of the combined off-gas stream to the waste heat recovery unit at a controlled pressure.

Preferably the process includes supplying a portion of the combined off-gas stream to the waste heat recovery unit at a variable volumetric flow rate.

Preferably the process includes supplying a portion of the combined off-gas stream to a burner unit of the waste heat recovery unit Preferably the process includes supplying a portion of the combined off-gas stream to a combustion chamber of the waste heat recovery unit that is downstream of a burner unit of the waste heat recovery unit.

Preferably the process includes controlling the split of off-gas in the second off-gas stream to the stoves and to the waste heat recovery by controlling the volumetric flow rate of the off-gas to the stoves.

According to the present invention there is also provided a direct smelting plant for direct smelting a metalliferous feed material and producing molten metal that includes:

(a) a pretreatment apparatus for pretreating metalliferous feed material;

(b) a direct smelting vessel for producing molten metal by way of a process for direct smelting preheated metalliferous feed material in the vessel;

(c) stoves for generating a hot blast of air or oxygen-enriched air for the process;

(d) a waste heat recovery apparatus for generating steam for the plant;

(e) an off-gas duct for taking away off-gas generated in the direct smelting vessel and supplying the off-gas by way of a first duct section to the pretreatment apparatus and by way of a second duct section to an off-gas flow control valve; and (f) a process controller for controlling operation of the plant, including operation of the off-gas flow control valve in the second duct section and therefore pressure in the direct reduction vessel while the process is producing molten metal.

Preferably the second duct section is adapted to supply off-gas to stoves and the waste heat recovery apparatus and the plant includes a water scrubber for cooling and removing particulate material and soluble gaseous species and metal vapours from off-gas flowing through the second duct section upstream of stoves and the waste heat recovery apparatus.

Preferably the process controller is adapted to control off-gas flow in the first off-gas stream to be above a minimum flow rate for maintaining fluidising conditions in the pretreatment apparatus.

Preferably the process controller is adapted to control off-gas flow in the first off-gas stream to be above a minimum flow rate to preheat metalliferous feed material to a predetermined temperature in the pretreatment apparatus.

Preferably the process controller utilises a time constant for controlling the pressure in the direct smelting vessel that is substantially faster than a time constant for controlling said minimum flow rate through said pre-treatment apparatus.

Preferably the time constant for controlling the pressure in the direct smelting vessel is an order of magnitude faster than the time constant for controlling the flow rate of off-gas through the pre-treatment apparatus.

Figure 2:
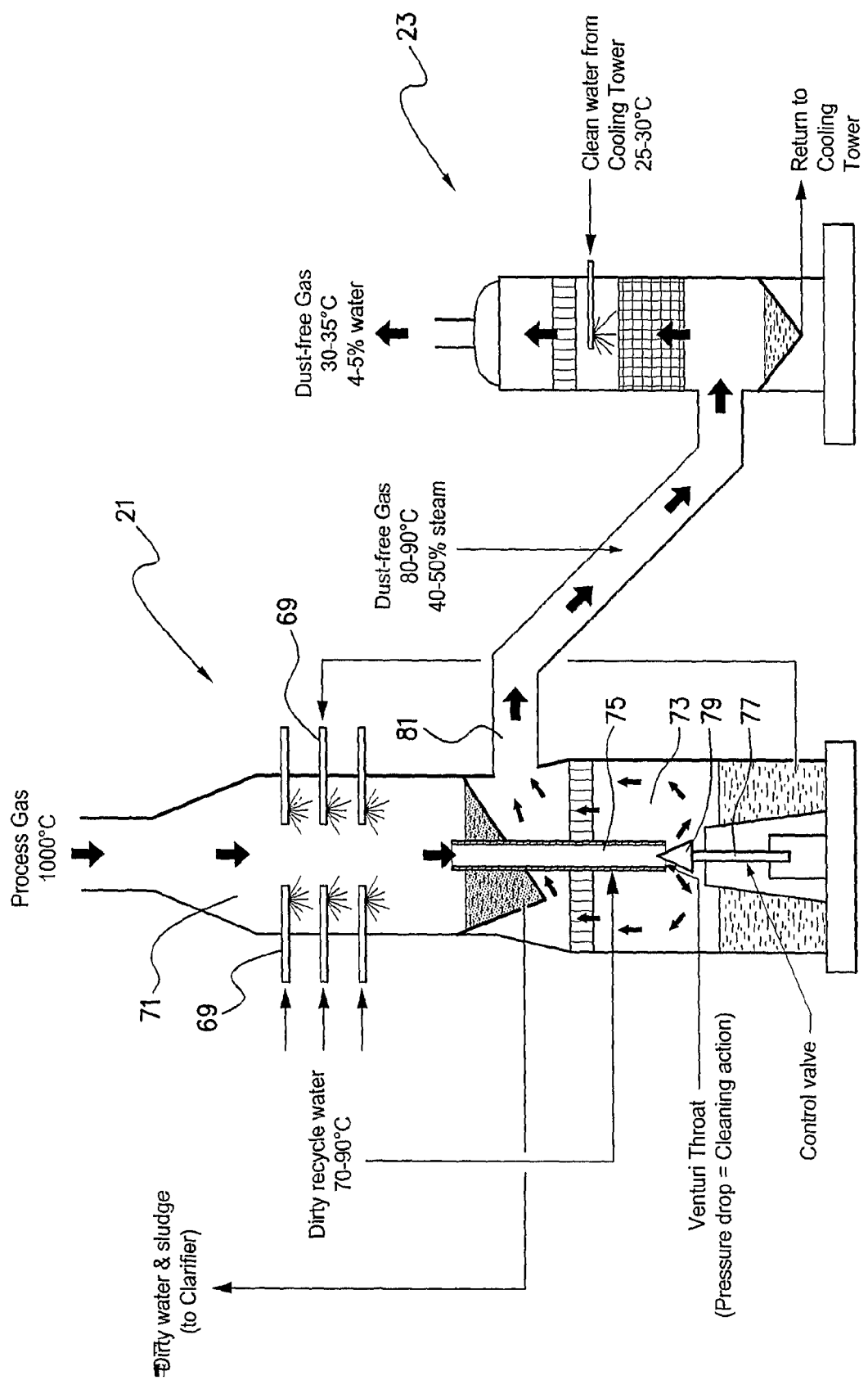

The present invention is described in more detail hereinafter with reference to the accompanying drawings, of which:

FIG. 1 is a diagrammatic view of one embodiment of a direct smelting plant in accordance with the present invention; and FIG. 2 is an enlarged view of the wet cone scrubber and off-gas cooler in the off-gas stream that supplies off-gas to the waste heat recovery unit and the stoves shown in FIG. 1.

The following description of the plant shown in the figures is in the context of using the plant to smelt iron-containing feed material to produce molten iron in accordance with the HIsmelt process as described in International application PCT/AU96/00197 in the name of the applicant. The disclosure in the patent specification lodged with the International application is incorporated herein by cross-reference.

The process is based on the use of a direct smelting vessel 3.

The vessel 3 is of the type described in detail in International applications PCT/AU2004/000472 and PCT/AU2004/000473 in the name of the applicant. The disclosure in the patent specifications lodged with these applications is incorporated herein by cross-reference.

The vessel 3 has a hearth that incudes a base and sides formed from refractory bricks, side walls which form a generally cylindrical barrel extending upwardly from the sides of the hearth and include an upper barrel section and a lower barrel section, a roof, an off-gas duct 9 in an upper section of the vessel 3, a forehearth 67 for discharging molten metal continuously from the vessel 3, and a tap hole for discharging molten slag periodically from the vessel 3.

The vessel 3 is fitted with a downwardly extending water-cooled hot air blast ("HAB") lance 7 extending into a top space of the vessel 3 and eight water-cooled solids injection lances 5 extending downwardly and inwardly through a side wall and into the slag.

In use, the vessel 3 contains a molten iron bath. Iron-containing feed material (such as iron ore fines, iron-bearing steel plant wastes or DRI fines), coal and fluxes (lime and dolomite) are directly injected into the bath via the solids injection lances 5.

Specifically, one set of lances 5 is used for injecting iron-containing feed material and fluxes and another set of lances 5 is used for injecting coal and fluxes.

The lances 5 are water cooled to protect them from the high temperatures inside the vessel 3. The lances 5 are typically lined with a high wear resistant material in order to protect them from abrasion by the gas/solids mixture being injected at high velocity.

Iron-containing feed material is pretreated by being preheated to a temperature in the range of 600-700° C. and prereduced in a fluidised bed preheater 17 before being injected into the bath.

Coal and fluxes are stored in a series of lock hoppers 25 before being injected at ambient temperatures into the bath. The coal is supplied to the lock hoppers 25 via a coal drying and milling plant 71.

The injected coal de-volatilises in the bath, thereby liberating $H_2$ and CO. These gases act as reductants and sources of energy. The carbon in the coal is rapidly dissolved in the bath.

The dissolved carbon and the solid carbon also act as reductants, producing CO as a product of reduction. The injected iron-containing feed material is smelted to molten iron in the bath and is discharged continuously via the forehearth 67. Molten slag produced in the process is discharged periodically via the slag tap hole (not shown).

The typical reduction reactions involved in smelting injected iron-containing feed material to molten iron that occur in the bath are endothermic. The energy required to sustain the process and, more particularly these endothermic reactions, is provided by reacting CO and $H_2$ released from the bath with oxygen-enriched air injected at high temperatures, typically 1200° C., into the vessel 3 via the HAB lance 7.

Energy released from the above-described post combustion reactions in the vessel top space is transferred to the molten iron bath via a "transition zone" in the form of highly turbulent regions above the bath that contain droplets of slag and iron. The droplets are heated in the transition zone by the heat generated from post combustion reactions and return to the slag/iron bath thereby transferring energy to the bath.

The hot, oxygen-enriched air injected into the vessel 3 via the HAB lance 7 is generated in hot blast stoves 11 by passing a stream of oxygen-enriched air (nominally containing 30 to 35% by volume $O_2$) through the stoves 11 and heating the air and thereafter transferring the hot oxygen-enriched air to the HAB lance 7 via a hot blast main 41.

The operation of the stoves 11 is coordinated to ensure that there is a continuous, uninterrupted flow of hot, oxygen-enriched air at a constant straight line temperature in the main 41 to the HAB lance 7.

Each stove 11 operates in accordance with a repeating sequence of phases that comprises a heating phase, a bottling phase, and a heat exchange phase that is a longer time period than the heating phase.

The stoves 11 are heated during heating phases of the stoves 11 by combusting (a) cooled and cleaned off-gas from the vessel 3, and/or (b) another fuel gas such as natural gas, and (c) combustion air in burner assemblies (not shown) of the stoves 11 and thereafter passing the combustion products through the stoves 11.

During heat exchange phases of the stoves 11, oxygen from an oxygen plant 29 is mixed into streams of pressurised air generated by a blower 31. These oxygen-enriched air streams are passed through the stoves 11 and are heated in the stoves 11 and thereby produce the hot, oxygen-enriched pressurised air streams for the vessel 3. These hot, oxygen-enriched air streams are often referred to as "hot blast" or "hot air blast".

The bottling phases of the stoves 11 are phases in which one of the stoves is essentially closed and is neither heated by combusted off-gas (and other fuel gas, such as natural gas) nor cooled by heat exchange with air streams.

The duration of the bottling phases of a given stove 11 is at least the amount of time required to open and close the valves necessary to change-over off-gas and hot air streams so as to switch over (a) the given stove from a heating phase to a heat exchange phase and (b) the other stove from a heat exchange phase to a heating phase.

Combustion products released from the stoves 11 during heating phases of the stoves 11 are cleaned in a flue gas desulphurisation (FGD) system 13. The FGD removes sulphur, which typically occurs in the form of hydrogen sulphide ($H_2S$) and sulphur dioxide ($SO_2$), from the combustion products. The off-gas produced in the vessel 3 contains sulphur and the sulphur is not totally removed in the off-gas cleaning that occurs downstream of the vessel 3 before the off-gas reaches the stoves 11, as described hereinafter.

Prior to being passed to the FGD system, combustion products released from the stoves 11 during heating phases of the stoves 11 may pass through heat exchangers (not shown) and preheat cooled and cleaned off-gas from the vessel 3 and combustion air before the heated off-gas and combustion air is supplied as feed materials to the burners of the stoves 11 during heating phases. The vessel off-gas and combustion air may be preheated to a temperature of around 180° C.

Off-gas is released from the vessel 3 via the off-gas duct 9 in the upper section of the vessel 3 and 5 passes initially through a radiation cooler, hereinafter referred to as an "off-gas hood", 15. Typically, the off-gas leaves the vessel and enters the hood at a temperature of the order of 1450° C.

The off-gas is cooled as it passes through the off-gas hood 15 and thereby results in the generation of steam which accumulates in steam drum 35. The off-gas hood may be of a type described in U.S. Pat. No. 6,585,929 that cools and partially cleans off-gas.

The off-gas stream leaving the off-gas hood 15 is at a temperature of approximately 1000° C. and is split into two streams.

With particular reference to FIG. 2, one split off-gas stream leaving the off-gas hood 15, which comprises between 55-65% of the off-gas from the vessel 3, passes first through a wet cone scrubber 21.

The scrubber 21 quenches and removes particulate material and soluble gaseous species and metal vapours from off-gas flowing through the scrubber. The off-gas temperature drop in the scrubber is from approximately 1000° C. to below 100° C. and typically between 65° C. and 90° C.

The scrubber 21 includes an upper chamber 71, a lower chamber 73, and a vertically extending pipe 75 that interconnects the chambers 71, 73. The scrubber 21 includes an off-gas control valve 77 in the lower end of the pipe 75. The control valve 77 includes an hydraulically operated cone element 79 that can move vertically to open or close the lower end of the pipe 75. The scrubber 21 includes water sprays 69 in the upper chamber 71 and further water sprays (not shown) positioned in relation to the pipe 75 and the control element 79. Re-circulating water within the scrubber and make-up water are supplied to the sprays.

The control valve 77 controls the flow rate of off-gas through the scrubber 21. This is the first variable flow rate constraint on off-gas from the vessel 3. Consequently, the control valve 77 controls the pressure in the direct smelting vessel 3, preferably to 0.8 bar gauge while the process is producing molten iron.

The off-gas from the scrubber 21 leaves the scrubber 21 via an outlet 81 in the lower chamber 73 and passes through an off-gas cooler 23 that further cools the off-gas to below 50° C., typically between 30° C. and 45° C., to remove sufficient moisture from the off-gas for it to be used as a fuel gas. Typically the off-gas leaving the cooler has 5% or less $H_2O$ and a mist content of less than 10 mg/Nm3 and typically 5.0 mg/Nm$^3$.

Under typical metal production conditions, the resulting off-gas is suitable for use as a fuel gas in (a) the stoves 11 (as described above) and (b) the WHR system 25. In addition, the scrubbed and cooled off-gas is suitable for drying coal in the drying and milling plant 71.

For the above purposes, the off-gas from the off-gas cooler 23 is split into three streams, with one stream being passed to the stoves 11, another stream being passed to the WHR system 25, and the third stream being passed to the drying and milling plant 71.

The off-gas stream from off-gas cooler 23 is a relatively rich off-gas. The stream that is passed to the WHR system 25 is mixed with cooled and cleaned off-gas that has passed through the preheater 17 as described hereinafter, which is a relatively lean off-gas, due to some pre-reduction of the iron-containing feed material in the pre-heater by CO and $H_2$ in the off-gas.

As detailed above, under typical metal production conditions, the combined off-gas stream has a calorific value that makes it suitable for combustion as a fuel gas.

The combined off-gas stream, an additional source of fuel gas in the form of natural gas (indicated by the numeral 83 in FIG. 1), and air are supplied to and combusted in the WHR system 25.

The combined off-gas stream is combusted within the WHR system 25 in a manner that maximises CO destruction, while minimising $NO_x$ formation.

The off-gas released from the WHR system 25 is combined with off-gas gas from the stoves 11 and then passes to the FGD system 13. $SO_2$ is removed in the FGD system 23 and the exhaust gas is released to the atmosphere via a stack 45.

The other split stream, which contains approximately 35-45% by volume of the off-gas stream, is passed through the fluidised bed preheater 17 for iron-containing feed material. The preheater 17 removes moisture from and preheats and prereduces the iron-containing feed material. The off-gas is a source of energy and a fluidising gas in the preheater 17.

A process controller of the plant controls the off-gas flow to the preheater 17 (a) to be above a minimum flow rate to maintain fluidising conditions in the preheater 17 and (b) to preheat iron-containing feed material to a substantially constant temperature, in the range of 600-700° C. while the process is producing molten metal.

The off-gas released from the preheater 17 is passed through a cyclone 61 and entrained dust is separated from the off-gas.

The off-gas then passes through a wet cone scrubber 63 that removes particulate material and soluble gaseous species and metal vapours from the off-gas and cools the off-gas from between 500° C. and 200° C. to below 100° C. and typically between 65° C. and 90° C.

The scrubber 63 is the same basic construction as the wet cone scrubber 21 described above. In particular, the scrubber 63 quenches and removes particulate material and soluble gaseous species and metal vapours from off-gas flowing through the scrubber. Moreover, as is the case with scrubber 21, the scrubber 63 includes an off-gas control valve that has an hydraulically operated cone element that can move vertically to open or close the valve and thereby control flow of off-gas through the scrubber.

The off-gas from the scrubber 63 then passes through an off-gas cooler 65 that further cools the off-gas to below 50° C., typically between 30° C. and 45° C., to remove sufficient moisture from the off-gas for it to be used as a fuel gas. Typically the off-gas leaving the cooler has 5% or less $H_2O$ and a mist content of less than 10 mg/Nm$^3$ and typically 5.0 mg/Nm$^3$.

As is described above, the cooled and cleaned off-gas is then combined with a stream of off-gas from cooler 23 and used as a fuel gas in a waste heat recovery (WHR) system 25.

The WHR system 25 includes:
- a thermal oxidiser, ie burner assembly, 37 and associated combustion chamber;
- a WHR unit, ie boiler, 39;
- a steam drum; and
- heat exchange equipment, such as superheat coils and a demineralised water economiser.

The WHR system 25 produces saturated steam. The saturated steam is combined with the saturated steam from the steam drum 35 of the off-gas hood 15 and the superheat coils of the WHR system 25 generates superheated steam from the saturated steam.

The steam raising equipment of the WHR system 25 comprises:
- a radiant screen to protect the downstream coils;
- a two-stage superheater section with desuperheater controls (where the quantity of superheat is controlled by injecting demineralised water as required to maintain the superheated steam at a temperature of 420° C.);
- a main evaporator section, consisting of three modules of convective coils;
- an economiser section; and
- a steam drum with three element demineralised water control.

The steam raised in the WHR system 25 and the off-gas hood 15 is used to drive the HAB blower 31 and the main air compressor (not shown) of oxygen plant 29, with the remainder being passed through a turbo-alternator that generates electrical power required to operate the plant.

The turbo-generator system includes a condensing turbine designed to receive superheated steam. The discharge from the turbine passes through a surface condenser operating at vacuum with the resultant condensate being pumped to the de-aerator via condensate pumps.

The use of the off-gas as a fuel gas within a plant offsets an amount of electrical power that would otherwise need to be obtained from an external electricity supply grid, which makes the plant generally self sufficient in terms of electrical power.

Typically, the burner assembly 37 of the WHR system 25 is a cylindrical carbon steel shell, with internal refractory and insulation.

In use, the burner assembly 37 of the WHR system operates with varying combined off-gas flow rates from the above-described split streams of off-gas, due to a number of factors including (a) variations in off-gas that is produced during operation of the process and therefore discharged from the vessel 3, (b) variations in the steam requirements of the plant, (c) variations in off-gas available for the burner assembly 37 of the WHR system 25 because of competing calls on off-gas for the stoves 11, and (d) variations in off-gas requirements for the stoves 11.

The process is designed to operate in a number of "states" that have different operating conditions during a smelting campaign, including by way of example the following process states:
(a) start-up;
(b) hot metal production—supply hot ore, coal, fluxes and hot blast;
(c) hold—ie no hot ore, supply coal, fluxes and hot blast;
(d) idle—ie no ore and no coal, supply hot blast and in some instances a fuel gas such as natural gas; and
(e) off-wind—ie no ore, no coal, and no hot blast.

During a hold state the calorific value of the off-gas can vary between being relatively lean and being relatively rich. The calorific value depends on the feed rate of coal into the bath and the feed rate of hot air blast into the vessel 3. These parameters affect the level of carbon in the off-gas and the levels of CO and $CO_2$ in the off-gas.

The calorific value of the off-gas during an idle state is relatively low. Typically only hot air blast is supplied to the vessel 3 (along with nitrogen purge gas supplied through the solids injection lances 5) and so the off-gas has a composition similar to air.

During an idle state the hot metal temperature is monitored and, if necessary, a fuel gas, such as natural gas, is supplied into the top space above the molten bath. This fuel gas is combusted in the hot air blast. This assists with heating the vessel 3 and the molten bath.

Combustion of fuel gas in this manner is typically complete and so the calorific value of the off-gas does not increase compared to the situation of an idle state where only hot air blast is supplied to the vessel 3.

Prior to combusting fuel gas in the vessel 3 when the process is in an idle state, the operators of the vessel may either tap slag to a minimum level or may even perform a slag drain. A slag tap leaves a certain minimum level of slag in the vessel 3 whereas a slag drain removes substantially all of the slag from the vessel. Reducing the level of slag in the vessel 3 allows the metal to be heated directly by the combustion. Slag acts as an insulator in these circumstances and reduces the amount of heat seen by the metal.

The volumetric flow rates and calorific values of off-gas produced in the vessel 3 in the above process states are different. For example, the flow rate and calorific value of off-gas are relatively high during a hot metal production state and relatively low during an idle state.

In addition, the volumetric flow rates and calorific values of off-gas produced in the vessel 3 during the course of a given process state are also different as a consequence of variations in operating conditions. For example, there may be variations in operating conditions during a hot metal production state that would result in different amounts and calorific values of off-gas being produced.

In addition, the volumetric flow rate of fuel gas that is available for the WHR system 25 varies with the phases of the stoves 11. Specifically, the split off-gas stream to the WHR system 25 has a substantially higher flow rate when the stoves 11 are operating in the bottling phases of the stoves. As is described above, substantially lower amounts of off-gas are required by the stoves 11 during bottling phases of the stoves 11 than is required during heating phases of the stoves 11.

In addition, the steam (and electricity) requirements of the plant, and therefore the required volumetric flow rates and calorific values of fuel gas for the WHR system 25, are different in different states of the process. For example, the steam (and electricity) requirements of the plant are typically of the order of 40-60% higher during a hot metal production state than during a start-up state.

In addition, the fuel gas requirements of the stoves 11 are different in different states of the process. For example, larger amounts of fuel gas are required during a hot metal production state than during an idle state.

In view of the above, during at least some states of the process there is a need for an alternative fuel gas, such as natural gas (or other fuel gas other than off-gas), to be supplied to the burner assembly 37 of the WHR system 25 to meet the steam requirements of the plant during a smelting campaign.

In addition, in view of the above, there is a need for varying flow rates of an alternative fuel gas, such as natural gas (or other fuel gas other than off-gas), to be supplied to the burner assembly 37 of the WHR system 25 in order to compensate for varying flow rates and calorific values of off-gas from the vessel 3 during a given state of the smelting campaign to meet the steam requirements of the plant.

In addition, in view of the above, during at least some of the states of the process, there is a need for an alternative fuel gas, such as natural gas (or other fuel gas), to be supplied to the burner assemblies of the stoves 11 to compensate for variations in flow rates and calorific values of off-gas to thereby maintain target flow rates and target calorific values of fuel gas for the burner assemblies.

This is particularly necessary when the process is operating in the off-wind, hold and idle states. During these states, off-gas flow to the stoves 11 is shut off altogether or at least is substantially reduced and, therefore, another fuel gas, such as natural gas is required to maintain operation of the stoves 11 at a required level during these process states.

Consequently, the process controller of the plant operates the burner assembly 37 of the WHR system 25 with varying flow rates of natural gas as an additional fuel gas to provide required flow rates and calorific values of fuel gas at any point in the process.

In addition, consequently, the process controller of the plant operates the burner assembly 37 of the WHR system 25 with varying flow rates of air to combust the varying flow rates of off-gas and natural gas to ensure optimum combustion.

In addition, consequently, the process controller of the plant operates the burner assemblies of the stoves 11 with varying flow rates of natural gas as an additional fuel gas to provide required flow rates and calorific values of fuel gas at any point in the process.

In addition, consequently, the process controller of the plant operates the burner assemblies of the stoves 11 with varying flow rates of air to combust the varying flow rates of off-gas and natural gas to ensure optimum combustion.

In addition, the process controller of the plant commences ramping up the air flow rate to the burner assembly 37 of the WHR system 25 a predetermined time period, typically 30 seconds, before there is an increase in off-gas to the burner assembly 37 due to a decrease in demand for off-gas in the stoves 11.

Similarly, the process controller of the plant commences ramping down the air flow rate to the burner assembly 37 of the WHR system 25 a predetermined time period, typically 30 seconds, before there is a decrease in off-gas to the burner assembly 37 due to an increase in demand for off-gas in the stoves 11.

The calorific value of off-gas at different points in the plant is an important parameter in determining the flow rates of natural gas required for the burner assembly 37 of the WHR system 25 and the burner assemblies of the stoves 11 at any point in time.

The plant includes mass spectrometers CV1, CV2, and CV3 at selected locations of the plant to determine the calorific values of the off-gas at these locations. The measured values of calorific values are processed by the process controller for the plant as part of the process of determining required flow rates of off-gas and natural gas.

The selected locations are in the off-gas hood 15 (CV1), downstream of the off-gas cooler 23 and upstream of the split of the off-gas to the stoves 11 and the WHR system 25 (CV2), and downstream of the pre-heater 61 (CV3).

Operating the above-described process with a range of different states also has an impact on pressure control in the vessel 3 during the different states.

In addition, the preheater 17 has certain minimum flow gas requirements in order to maintain the iron-containing feed material in a fluidised state. Gas flow through the preheater 17 is controlled by the control valve in the wet cone scrubber 63 that is downstream of the preheater 17.

The above description indicates that vessel pressure control is via the control valve 77 of the wet cone scrubber 21 when the process is producing molten iron, i.e. when operating in a hot metal production state.

More particularly, the plant includes a pressure sensor P1 in the off-gas hood 15 that monitors the pressure in off-gas flowing through the hood on a continuous basis. The process controller of the plant is responsive to the monitored pressure and operates the control valve 77 of the wet cone scrubber 21 to adjust the pressure as required, preferably to maintain a constant vessel pressure, when the process is operating in a hot metal production state. The time constant of the control circuit of the control valve 77 is considerably faster than the time constant of the control circuit of the control valve in the scrubber 63 downstream of the preheater 17. Hence, as between the control of pressure in the vessel 3 and the control of gas flow rate through the preheater 17, during the metal production state, the control of vessel pressure dominates.

It is still necessary to maintain control of pressure in the vessel 3 during other states, particularly the hold and idle states, of the process. Such pressure control is achieved during these states via the above-described control valve in the wet cone scrubber 63 downstream of the preheater 17 rather than via the control valve 77 of the wet cone scrubber 21.

More particularly, when the process is operating in these states, the control valve 77 of the wet cone scrubber 21 is at least substantially closed so that there is no or at most a minimal flow of off-gas through the scrubber 21 and thereafter to the stoves 11 and the WHR system 25 from this source. Consequently, the control valve in the wet cone scrubber 63 becomes the dominant pressure controller during the hold and idle states. This also ensures gas flow through the pre-heater so that the metalliferous material is maintained in a fluidised state.

Additionally, when the process moves into the hold and idle states, the process controller operates to reduce the flow rate set point of hot air blast that is supplied to the vessel 3 from the stove 11. The pressure set point of the vessel may also be reduced. Typically the set point is reduced from 0.8 bar gauge to 0.4 bar gauge.

During hold and idle states, a portion of the off-gas that has passed through the preheater 17 is recycled and combined with the off-gas from the vessel 3 so as to assist with maintaining fluidising conditions within the preheater 17.

At off-wind state, no hot air blast is supplied to the vessel. The scrubber 63 downstream of the preheater 17 is closed and all of the off-gas within the preheater 17 is recycled so as to operate as fluidising gas.

During hold and idle states the stoves 11 produce a reduced amount of hot air blast. In order to ensure that the stoves 11 do not exceed a maximum temperature, the total energy of the fuel gas supplied to the stoves 11 is reduced compared with the total energy of the fuel gas supplied to the stoves during hot metal production. In this way, the energy input to the stoves 11 is reduced during hold and idle states so as to match the reduced energy requirements of the reduced hot air blast flow.

Many modifications may be made to the embodiment of the present invention described above without departing from the spirit and scope of the invention.

The invention claimed is:

1. A direct smelting process for producing molten metal from a metalliferous feed material in a direct smelting vessel, the process comprising:
   (a) direct smelting metalliferous feed material above atmospheric pressure in a direct smelting vessel containing a molten bath of metal and slag and producing process outputs of molten metal, molten slag, and an off-gas, the process including supplying (i) pretreated solid metalliferous feed material, (ii) solid carbonaceous feed material, and (iii) air or oxygen-enriched air to the vessel;
   (b) splitting the off-gas released from the direct smelting vessel into at least two off-gas streams including a first off-gas stream and a second off-gas stream, using the first off-gas stream in a pretreatment apparatus for pretreating metalliferous feed material that is subsequently supplied to the direct smelting vessel, and using the second off-gas stream as a fuel gas in at least one of (i) stoves for generating a hot blast of air or oxygen-enriched air and (ii) a waste heat recovery apparatus for generating steam; and (c) controlling pressure in the direct smelting vessel by controlling off-gas pressure in the second off-gas stream while the process is operating in accordance with step (a) and producing molten metal;

wherein step (c) includes controlling the pressure in the direct smelting vessel by controlling the flow of off-gas flowing through a pressure control scrubber by opening or closing an off-gas flow control valve in the pressure control scrubber.

2. The process defined in claim 1 wherein step (c) includes controlling the pressure in the direct smelting vessel to be substantially constant pressure while the process is operating in accordance with step (a) and producing molten metal.

3. The process defined in claim 1 wherein step (c) includes controlling the pressure in the direct smelting vessel to be at least 0.6 bar gauge while the process is operating in accordance with step (a) and producing molten metal.

4. The process defined in claim 1 wherein step (c) includes controlling the pressure in the direct smelting vessel to be within the range of 0.6 to 1.0 bar gauge while the process is operating in accordance with step (a) and producing molten metal.

5. The process defined in claim 1 wherein step (c) includes controlling the pressure in the direct smelting vessel to be within the range of 0.7 to 0.9 bar gauge while the process is operating in accordance with step (a) and producing molten metal.

6. The process defined in claim 1 wherein step (c) includes controlling the pressure in the direct smelting vessel to be 0.8 bar gauge while the process is operating in accordance with step (a) and producing molten metal.

7. The process defined in claim 1 includes cooling and removing particulate material and soluble gaseous species and metal vapours from the second off-gas stream in a wet scrubber upstream of the at least one of the stoves and the waste heat recovery apparatus.

8. The process defined in claim 1 wherein step (c) includes controlling the pressure in the direct smelting vessel by controlling the flow of off-gas flowing through an off-gas flow control valve.

9. The process defined in claim 1 wherein the pre-treatment apparatus is a fluid bed based pre-treatment apparatus.

10. The process defined in claim 1 wherein the pretreatment apparatus includes an off-gas flow control valve for regulating flow rate of the first stream of off-gas through said pretreatment apparatus.

11. The process defined in claim 10, wherein:
the off-gas flow control valve is a pretreatment flow control valve;
step (c) includes controlling the pressure in the direct smelting vessel by controlling the flow of off-gas flowing through a primary flow control valve; and
the process further comprises selecting a time constant of a control circuit for the primary flow control valve to be significantly faster than a time constant of a control circuit for the pretreatment flow control valve.

12. The process defined in claim 11 wherein the time constant of the primary flow control valve is twice as fast as the time constant of the pretreatment flow control valve.

13. The process defined in claim 11 wherein the time constant of the primary flow control valve is an order of magnitude faster than the time constant of the pretreatment flow control valve.

14. The process defined in claim 11 wherein the time constant of the primary flow control valve is in the order of ten times faster than the pretreatment flow control valve.

15. The process defined in claim 1 includes cooling and removing particulate material and soluble gaseous species and metal vapours from the first off-gas stream in a wet scrubber downstream of the pretreatment apparatus.

16. The process defined in claim 1 includes controlling the off-gas flow in the first off-gas stream to be above a minimum volumetric flow rate for maintaining fluidising conditions in the pretreatment apparatus while the process is operating in accordance with step (a) and producing molten metal.

17. The process defined in claim 1 includes controlling the off-gas flow in the first off-gas stream to be above a minimum volumetric flow rate to preheat metalliferous feed material to a predetermined temperature in the pretreatment apparatus while the process is operating in accordance with step (a) and producing molten metal.

18. The process defined in claim 17 wherein the predetermined temperature for the pretreated metalliferous feed material in the pretreatment apparatus is in the range of 600-700° C. when the metalliferous feed material is an iron-containing material.

19. The process defined in claim 1 includes:
discharging the first off-gas stream from the pretreatment apparatus; and
after the first off-gas stream has been discharged, supplying the first off-gas stream to the waste heat recovery apparatus for generating steam for the process.

20. The process defined in claim 1 includes:
discharging the first off-gas stream from the pretreatment apparatus; and
forming a combined off-gas stream upstream of the waste heat recovery apparatus from (i) the first off-gas stream discharged from the pretreatment apparatus and (ii) off-gas in the second off-gas stream and supplying at least a portion of the combined stream to the waste heat recovery apparatus for generating steam for the process.

21. The process defined in claim 20 includes supplying a portion of the combined off-gas stream to the waste heat recovery apparatus at a controlled pressure.

22. The process defined in claim 21 includes supplying a portion of the combined off-gas stream to the waste heat recovery apparatus at a variable volumetric flow rate.

23. The process defined in claim 22 includes supplying a portion of the combined off-gas stream to a burner unit of the waste heat recovery apparatus.

24. The process defined in claim 23 includes supplying a portion of the combined off-gas stream to a combustion chamber of the waste heat recovery apparatus that is downstream of a burner unit of the waste heat recovery apparatus.

25. The process defined in claim 1 includes controlling a split of off-gas in the second off-gas stream to the stoves and to the waste heat recovery apparatus by controlling a volumetric flow rate of the off-gas to the stoves.

26. A direct smelting process for producing molten metal from a metalliferous feed material in a direct smelting vessel, the process comprising:
producing an off-gas;
splitting the off-gas into at least two streams including a first stream and a second stream;
using the second stream of off-gas from the vessel as a fuel gas in at least one of (i) stoves for generating a hot blast of air or oxygen-enriched air for the process and (ii) a waste heat recovery apparatus for generating steam for the process;

controlling pressure in the vessel by controlling pressure in the second off-gas stream while the process is producing molten metal; and controlling a split of off-gas in the second off-gas stream by controlling a volumetric flow rate to the stoves.

27. A direct smelting plant for direct smelting a metalliferous feed material and producing molten metal, the plant comprising:

(a) a pretreatment apparatus for pretreating metalliferous feed material;

(b) a direct smelting vessel for producing molten metal by way of a process for direct smelting preheated metalliferous feed material in the vessel;

(c) stoves for generating a hot blast of air or oxygen-enriched air for the process;

(d) a waste heat recovery apparatus for generating steam for the plant;

(e) an off-gas duct for taking away off-gas generated in the direct smelting vessel and supplying the off-gas by way of a first duct section to the pretreatment apparatus and by way of a second duct section to an off-gas flow control valve, the second duct section being adapted to supply off-gas to the stoves and the waste heat recovery apparatus;

(f) a process controller for controlling operation of the plant, including operation of the off-gas flow control valve in the second duct section and therefore pressure in the direct reduction vessel while the process is producing molten metal; and (g) a wet scrubber for cooling and removing particulate material and soluble gaseous species and metal vapours from off-gas flowing through the second duct section upstream of the stoves and the waste heat recovery apparatus.

28. The plant defined in claim 27 wherein the process controller is adapted to control off-gas flow in the first off-gas stream to be above a minimum flow rate for maintaining fluidising conditions in the pretreatment apparatus.

29. The plant defined in claim 27 wherein the process controller is adapted to control off-gas flow in the first off-gas stream to be above a minimum flow rate to preheat metalliferous feed material to a predetermined temperature in the pretreatment apparatus.

30. The plant defined in claim 28 wherein the process controller utilises a time constant for controlling the pressure in the direct smelting vessel that is substantially faster than a time constant for controlling said flow through said pre-treatment apparatus.

31. The plant defined in claim 30 wherein the time constant for controlling the pressure in the direct smelting vessel is an order of magnitude faster than the time constant for controlling the flow of off-gas through the pre-treatment apparatus.

32. A direct smelting process for producing molten metal from a metalliferous feed material in a direct smelting vessel, the process comprising:

(a) direct smelting metalliferous feed material above atmospheric pressure in a direct smelting vessel containing a molten bath of metal and slag and producing process outputs of molten metal, molten slag, and an off-gas, the process including supplying (i) pretreated solid metalliferous feed material, (ii) solid carbonaceous feed material, and (iii) air or oxygen-enriched air to the vessel;

(b) splitting the off-gas released from the direct smelting vessel into at least two off-gas streams including a first off-gas stream and a second off-gas stream, using the first off-gas stream in a pretreatment apparatus for pretreating metalliferous feed material that is subsequently supplied to the direct smelting vessel, and using the second off-gas stream as a fuel gas in at least one of (i) stoves for generating a hot blast of air or oxygen-enriched air and (ii) a waste heat recovery apparatus for generating steam;

(c) controlling pressure in the direct smelting vessel by controlling off-gas pressure in the second off-gas stream while the process is operating in accordance with step (a) and producing molten metal; and (d) controlling a split of off-gas in the second off-gas stream to the stoves and to the waste heat recovery apparatus by controlling a volumetric flow rate of the off-gas to the stoves.

* * * * *